(12) United States Patent
Huffschmid

(10) Patent No.: US 7,443,866 B2
(45) Date of Patent: Oct. 28, 2008

(54) SYSTEM AND METHOD FOR SWITCHING A CONNECTION

(75) Inventor: Norbert Huffschmid, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 1151 days.

(21) Appl. No.: 10/244,602

(22) Filed: Sep. 17, 2002

(65) Prior Publication Data

US 2003/0067933 A1 Apr. 10, 2003

(30) Foreign Application Priority Data

Sep. 17, 2001 (DE) ............................. 101 45 758

(51) Int. Cl.
*H04L 12/28* (2006.01)
*H04J 3/16* (2006.01)

(52) U.S. Cl. ........................................ 370/401; 370/468

(58) Field of Classification Search .................. 370/352
See application file for complete search history.

(56) References Cited

U.S. PATENT DOCUMENTS

| | | | |
|---|---|---|---|
| 5,898,839 A * | 4/1999 | Berteau | 709/227 |
| 6,069,890 A | 5/2000 | White et al. | |
| 6,163,535 A | 12/2000 | Jordan et al. | |
| 6,301,352 B1 * | 10/2001 | Chung et al. | 379/229 |
| 6,304,653 B1 * | 10/2001 | O'Neil et al. | 379/265.09 |
| 6,529,596 B1 * | 3/2003 | Asprey et al. | 379/224 |
| 2003/0055887 A1 * | 3/2003 | Mitreuter et al. | 709/203 |
| 2003/0142806 A1 * | 7/2003 | Unger | 379/210.01 |
| 2004/0013107 A1 * | 1/2004 | Mitreuter et al. | 370/352 |

FOREIGN PATENT DOCUMENTS

| | | |
|---|---|---|
| DE | 199 39 367 A1 | 4/2001 |
| DE | 199 46 658 A1 | 4/2001 |
| DE | 199 48 433 A1 | 4/2001 |
| DE | 199 48 458 A1 | 4/2001 |
| DE | 100 00 809 A1 | 8/2001 |
| DE | 100 03 272 A1 | 8/2001 |
| EP | 0 959 593 A2 | 11/1999 |
| EP | 1 014 633 A2 | 6/2000 |
| EP | 1 091 552 A2 | 4/2001 |

OTHER PUBLICATIONS

XP-000833939—P. Curtin et al., "Tigris—A Gateway between circuit switched and IP networks", 1999, pp. 70-81, No. 2 ISSN 0014-0171 Ericsson, Stockholm, Sweden.

* cited by examiner

*Primary Examiner*—Andrew Lee
(74) *Attorney, Agent, or Firm*—Bell, Boyd & Lloyd LLP

(57) ABSTRACT

A system and method for switching a connection between a first and a second terminal of a communications network, where switching takes place upon a request from outside this communications network, two time-slot-controlled inputs for transmission segments of a media gateway are connected by means of a data line, a CtD connection request is sent from a CtD server to the media gateway, a connection is established between one input and the first terminal and between another input and the second terminal, and the two connections are switched together to form a transmission segment.

13 Claims, 1 Drawing Sheet

SYSTEM AND METHOD FOR SWITCHING A CONNECTION

CLAIM FOR PRIORITY

This application claims priority to German Application No. 10145758.8 which was filed in the German language on Sep. 17, 2001.

TECHNICAL FIELD OF THE INVENTION

The present invention relates to a system and method for switching a connection between two terminals of a communications network.

BACKGROUND OF THE INVENTION

Conventionally, a connection initiated between two subscribers of a communications network, both subscribers are each called separately by a special terminal located outside the communications network, for example a computer as an automatic operator. As soon as there is a connection with both subscribers and the special terminal, the working signals and the control signals for possible service recognitions are then transferred from one connection to the other through this terminal. Such a switching method is used in telephone networks in call centers. A disadvantage is the relatively complicated implementation and the required high performance capacity of the terminal that establishes the connection.

Such switching of a connection is of particular interest in telephone networks for the "click to dial" (CtD) function from the Internet. "Click to dial" is understood to mean an Internet feature with which it is possible for a Web surfer to initiate a telephone connection between two subscribers (terminals) by means of a mouse click. Normally, one subscriber is the Web surfer himself/herself, and the other subscriber can be any other subscriber, but preferably an employee of the consulting or service team of a product or service provider on the Internet.

In this connection, the "click to dial," which is provided, for example, by placing a corresponding pushbutton on the website of a provider, represents a rather significant competitive advantage by offering quick and easy access to a competent telephone consultant, in order to answer detailed customer questions. In a conventional method of establishing a connection, an origin switching center, a target switching center, and possibly several transit switching centers are involved at first. In the case of a "click to dial" call, on the other hand, there are no origin switching centers. Instead, two connections that are independent of one another are established, at first, and subsequently switched together.

If this function is implemented similarly to the switching of calls in call centers, two connections must be initiated by a controller that functions as a terminal of the communications network, and as soon as both connections have been established, the controller must forward the working data (the digitized voice data or other data to be transmitted) of the one connection via the other, and vice versa.

For this purpose, there are already various solutions: for example, to implement the "click to dial" feature, a corresponding hardware loop was provided in the Elektronisches Wählsystem Digital (EWSD) [electronic dialing system, digital] from Siemens, which is described in DE 199 46 658 A1, to support this functionality. There, in a communications network with a central signal channel independent of the working data channels, two inputs for transmission segments at a transit switching center are connected by means of a data line. A control device issues a control signal on the central signal channel, causing a connection to be relayed from the one input to the first subscriber and from the second input to the second subscriber. The terminal signals of the connections to the subscribers are transmitted reciprocally.

Such solutions were also implemented in connection with other hardware components (e.g., EWSD V14-LM 40166 or SURPASS Open Service Platform by means of ISL and IN-CPH).

However, these solution approaches are aimed at initiating the required establishment of the connection in EWSD by means of ISUP signaling (ISDN User Part signaling), as well as controlling the voice path through connection within EWSD. In every case, this means increased development and implementation effort and expense for additional hardware components that would have to be retrofitted into existing communications hardware or would have to replace such hardware. However, this would require the network operator to make significant investments.

SUMMARY OF THE INVENTION

The present invention discloses a system and method that make "click to dial" connections possible in a simple and inexpensive manner, on the basis of existing communications hardware, particularly on the basis of a corresponding media gateway.

The present invention provides a system and method for switching a connection between two terminals of a communications network.

In one embodiment of the invention, the invention includes two time slot controlled inputs for transmission segments, particularly for voice-over IP (VoIP) transmission segments of a media gateway, which are first connected with one another by means of a data line. At the same time, the VoIP media gateway hiG700 preferably used here implements the cooperation between the TDM (Time Division Multiplex) trunks connected to DSP (Digital Signal Processing) cards and the IP network (Internet Protocol network). In normal use, the DSP cards are connected via the ports of the TDM trunks for connection to external switching centers or private branch systems.

A CtD connection request is sent from a CtD server to the media gateway, causing the use of the inputs connected with one another for the transmission of signals in a common time slot. Synchronization of the inputs that are connected in pairs by means of a data line is assured in this way, and the voice paths in the media gateway connected with one another in this way are permanently switched through as a result. The administration of such a through connection takes place exactly as if a corresponding media gateway controller were present for signaling incoming VoIP connections.

A connection is then established between the one input and the first terminal, and another connection is established between the other input and the second terminal.

In this connection, a CtD connection request includes two setup (create connection) messages to the media gateway, which from the point of view of the media gateway are interpreted as two incoming TDM connections for establishing a VoIP connection. Since both setup messages belong to time-slot-controlled inputs that are connected with one another by means of the data line (TDM loop), simple switching together of the two connections to form a transmission segment can now be carried out.

In a preferred embodiment, an additional step is carried out before the second process step, after the availability of inputs connected in pairs for transmission segments in a common time slot has been determined. This precludes the possibility that a CtD connection request from a CtD server to the media gateway addresses inputs connected in pairs (ports of a TDM trunk connected with one another in a common time slot) that are already busy due to existing connections. In the case of a CtD connection request, if the corresponding availability of inputs connected in pairs is present, two ports belonging to one another are determined and the setup message is generated, which is then transmitted by the CtD server to the media gateway.

It is preferable if the availability of inputs connected in pairs for transmission segments is determined by time-cycle-controlled inquiries to the media gateway. This can be done, for example, such that the CtD server waits for a log-on of the media gateway, then sends HEARTBEAT messages (messages at regular intervals) and administers tables concerning the availability of the individual inputs (TDM ports).

One advantage of the invention is that a time-critical determination of the availability of inputs connected in pairs results from the fact that availability data for transmission segments is obtained by inquiries to a database in which the data is stored. In this way, the computer task is transferred from the media gateway to the database, and the media gateway is relieved of this burden.

In another embodiment according to the invention, a media gateway is structured such that it is connected with an IP network and has complete protocol functionality, for example an H.323 protocol, such that a CtD connection request can be implemented with a CtD server that communicates with the media gateway. Hence, at least two inputs for transmission segments of the media gateway are connected with one another by means of a data line.

With the existing network components, particularly a VoIP media gateway, and new components that can be implemented in a relatively simple manner, such as the CtD server, the "click to dial" feature can be provided, which otherwise could not be made without significantly greater effort and expense. The CtD server also does not require any kind of special hardware (SS7 cards, switching networks, or the like), and the connection to the IP network can be made via a standard Ethernet 10baseT card. All of the required software components can be implemented on a commercially available PC, using public domain software.

Another advantage of the invention is that control of the media gateway used here is based on the SLAP (Signaling LAN Application Protocol), by way of which call control messages that are assigned to a specific time slot of the TDM trunks connected with the media gateway are signaled. In the generation of the CtD connection request, the CtD server ensures that the setup messages belong to TDM time slots that are connected with one another by the TDM loop, for which purpose it masters a rudimentary SLAP protocol. Therefore, the development of new protocol software for the communication between the CtD server and the media gateway is therefore not necessary.

In a preferred embodiment, a Web application is made available on the CtD server, with an interface by way of which a subscriber can initiate his/her CtD connection request. Since such Web servers for making available Web applications already exist in-house at companies that implement e-commerce strategies, such a Web server can also be used as a CtD server. It is preferable in this connection if the Web application communicates directly with the SLAP protocol application for the signal transmission. In this way, complicated conversion steps for implementing a CtD connection request are avoided and, at the same time, the standard protocol functionality is used.

There are additional advantages resulting from the fact that current availability data concerning inputs connected in pairs for transmission segments in a common time slot are stored in a database application. This availability data could be queried, for example, by means of a time-cycle-controlled inquiry from inputs connected with one another in a common time slot at the media gateway (TDM ports connected with one another), and updated in the database application. In this way, current availability data can be called up at any time and accessed in the generation of the CtD connection request, without any additional burden on the computer capacity of the media gateway. In addition, it is possible to record the connections established (for the purpose of calculating charges) in the database.

It is also advantageous in another preferred embodiment, in terms of distributing network load, if the Web application, the SLAP protocol application and the database application run on different servers linked to one another in a network, in order to achieve a balanced capacity utilization of the different computers (Web server, protocol server, database server, media gateway), particularly when there is a high level of telecommunications traffic, by in each instance dividing the required computer capacity among the different processors. By separating the Web application and the database application from the SLAP application, the network operator can also change the graphic user interface and the post processing of charges in any way desired, and adapt them to its needs.

In still another preferred embodiment of the invention, signaling on the transmission segments is carried out on the basis of a standardized protocol, particularly the H.323 protocol. H.323 is a globally accepted standard for audio/video/data communication. It specifically describes how multimedia communications between user terminals, network components, and assigned additional services in local and wide-area protocol (LAN and WAN IP protocol) networks take place. Particularly in the case where the method according to the invention and the media gateway used in the related arrangement include complete H.323 functionality, this makes the conversion of data to be transmitted possible without any qualitative or time restrictions.

In another embodiment according to the invention, it is advantageous if a network operator offers "Voice over IP" based on the SURPASS hiG700 VoIP media gateway, using the SLAP protocol. By simply re-plugging the inputs at the media gateway, in other words by connecting ports of a TDM trunk in the same time slot by means of a data line (DSP loop), and by using the CtD server software, the "click to dial" feature can be implemented immediately and without any additional hardware.

BRIEF DESCRIPTION OF THE DRAWINGS

The invention is explained in detail below, using an exemplary embodiment.

DETAILED DESCRIPTION OF THE PREFERRED EMBODIMENTS

Figure 1:
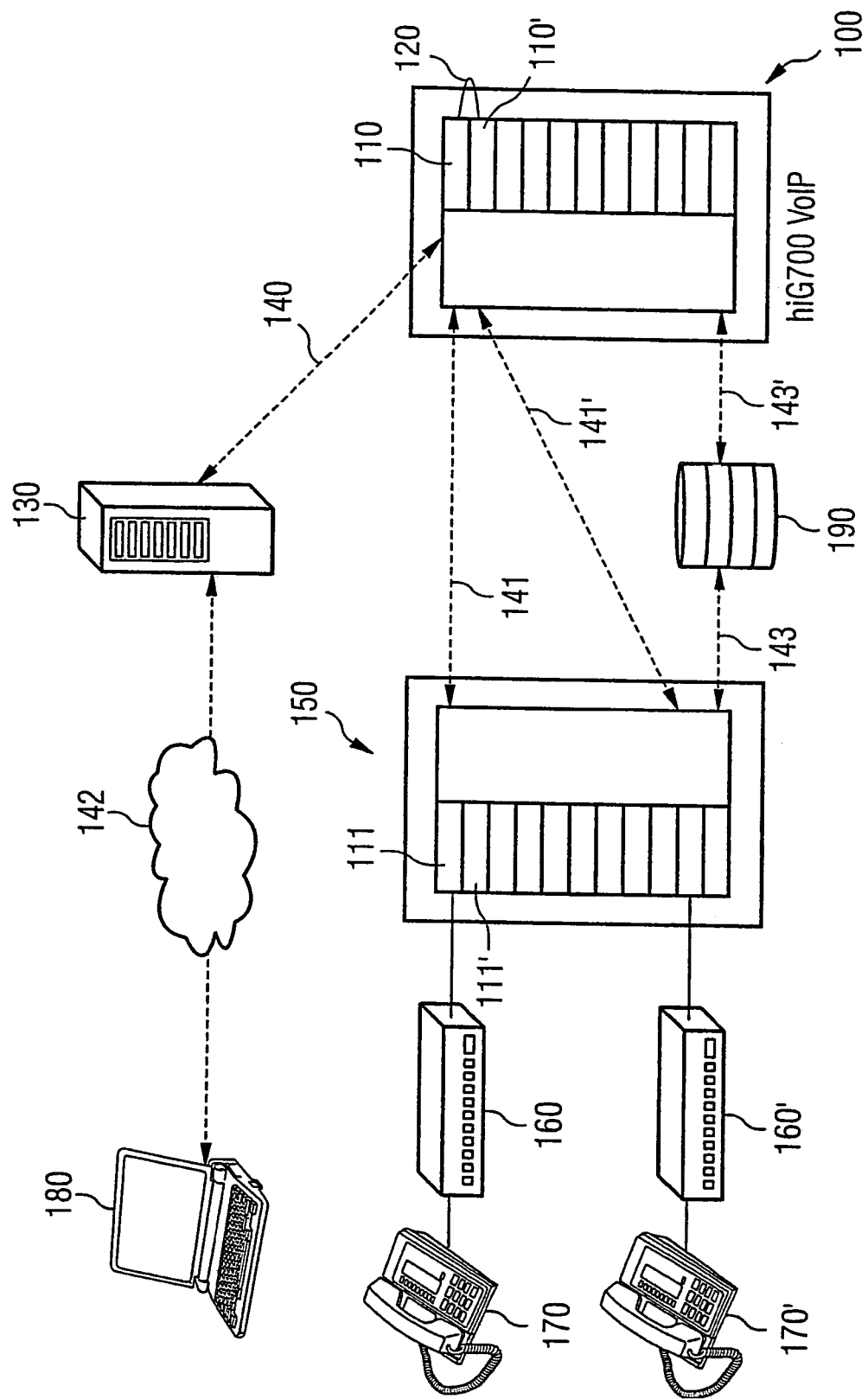
FIG. 1 shows a communications network with a media gateway.

FIG. 1 shows a communications network with a media gateway 100 of the type SURPASS hiG700 VoIP, having inputs 110 and 110' connected with one another in pairs, by way of a data line 120. The media gateway 100 is able to establish connections in a digitally switched IP network, for which purpose the inputs 110 and 110' are equipped with DSP cards (Digital Signal Processing cards) on the side of this network, for example HiPer DSP cards on the side of this network, to which TDM trunks (Time Division Multiplex card switchboard) are connected (typically on the line-switched network side), the ports of which are in the end connected with one another in pairs, via the data lines 120, and in the same time slot.

Via a CtD server 130 that communicates with the media gateway 100 via a network connection 140, a CtD connection request is transmitted to the media gateway 100, which utilizes inputs 100 and 100' (TDM loop) connected with one another in pairs via the data line 120, in the same time slot, for establishing connections and switching them together.

The media gateway 100 treats the incoming CtD connection request as if two TDM connections coming in from the line-switched network, via the transmission segments 141 and 141' in the exemplary embodiment shown here, to another media gateway 150, were to be established. At the latter, connections are in the end established in the line-switched network from the inputs 111 and 111' via switches 160 and 160'(line switches) to the addressed terminals 170 and 170', which in this case are conventional analog telephones. By means of the TDM loop at the media gateway 100, the transmission segments 141 and 141' in the IP network are permanently switched through and synchronized, thereby making it possible for the two requested connections to the subscribers with the terminals 170 and 170' to be switched together.

In addition, the CtD connection request can be transmitted from an Internet computer 180, for example from a laptop, via the Internet 142 to the CtD server 130, as shown here. In this exemplary embodiment, the Web application that interacts with the SLAP protocol, which is required for transmitting the CtD connection request to the media gateway 100 via the network connection 140, is also available on the CtD server 130.

It is also provided that a database application is set up on the CtD server 130, which not only stores the current availability data of inputs 110 and 110' connected with one another in pairs at the media gateway 100, but may also record the connection data for calculating charges. The availability data can be queried by the CtD server 130, for example, by means of a time-cycle-controlled inquiry to the media gateway 100.

In this exemplary embodiment, a gatekeeper 190 is also provided, which is connected with the media gateway 100 and the additional media gateway 150 by way of transmission segments 143 and 143'. The use of such a gatekeeper is optional. However, if it is present, as is the case in this exemplary embodiment, it takes on functions such as bandwidth management, authorization and authentication of gateways and terminals or translation between network addresses and telephone numbers that conform to E.164. This is also the case in the present exemplary embodiment, in which not all the inputs 110 and 110' at the media gateway have to have a TDM loop. Inputs 110 and 110' not connected by means of a data line 120 can therefore be lable for line connections from a line-switched SCN (Switched Circuit Network) network. In this way, the "click to dial" feature can be implemented immediately and without additional hardware in the network configuration as described, in which a network operator already offers "Voice over IP" on the basis of the hiG700 VoIP media gateway and the SLAP protocol, by simply re-plugging the TDM trunks (DSP loop) at a media gateway, together with the use of CtD server software.

What is claimed is:

1. A method for switching a connection between a first and a second terminal of a communications network, where switching occurs upon request from a source outside of the communications network, comprising:
   connecting two time-slot-controlled inputs for transmission segments of a media gateway via a data line;
   sending a CtD connection request from a CtD server to the media gateway such that the inputs connected with one another are configured for transmission of signals in a common time slot;
   establishing a connection between a first of the inputs and the first terminal and a connection between a second of the inputs and the second terminal; and
   switching the two connections together to form a transmission segment.

2. The method according to claim 1, further comprising, before sending, determining availability of inputs connected in pairs for the transmission segments in a common time slot.

3. The method according to claim 2, wherein the availability of inputs connected in pairs for the transmission segments is determined by time-cycle-controlled inquiry to the media gateway.

4. The method according to claim 3, wherein the availability of inputs connected in pairs for the transmission segments is determined by querying availability data stored in a database.

5. The system of claim 1, wherein a Web application, a SLAP protocol application, and the database application run on different servers linked to one another in a network.

6. A system for switching a connection between a first and second terminal of a communications network, comprising:
   a media gateway connected with an IP network and has protocol functionality;
   a CtD server communicating with the media gateway;
   at least two inputs for transmission segments of the media gateway connected with one another via a data line; and
   a database application in which current availability data of inputs connected in pairs for the transmission segments is stored in a common time slot on the media gateway.

7. The system according to claim 6, wherein the CtD server communicates with the media gateway via a SLAP protocol application.

8. The system according to claim 7, wherein the CtD server makes available a Web application, with an interface such that a subscriber can initiate a CtD connection request.

9. The system according to claim 8, wherein the Web application communicates directly with the SLAP protocol application for signal transmission.

10. The system according to claim 6, wherein signaling on the transmission segments proceeds on the basis of a standardized protocol.

11. The system of claim 6, wherein a Web application, a SLAP protocol application, and the database application run on different servers linked to one another in a network.

12. A media gateway for switching of connections, comprising:
   connecting two time-slot-controlled inputs for transmission segments of a media gateway via a data line;
   sending a CtD connection request from a CtD server to the media gateway such that the inputs connected with one another are configured for transmission of signals in a common time slot;
   establishing a connection between a first of the inputs and the first terminal and a connection between a second of the inputs and the second terminal; and
   switching the two connections together to form a transmission segment.

13. The media gateway of claim 12, wherein a Web application, a SLAP protocol application, and the database application run on different servers linked to one another in a network.

* * * * *